CONTROL FOR MAGNETIC MEMORY MATRIX

Filed Jan. 9, 1961 5 Sheets-Sheet 1

INVENTORS
Robert W. Hoedemaker
Charles Molnar
By: Wallenstein Spangenberg & Hattis Attys.

CONTROL FOR MAGNETIC MEMORY MATRIX

Filed Jan. 9, 1961 5 Sheets-Sheet 2

INVENTOR.S.
Robert W. Hoedemaker
Charles Molnar
By: Wallenstein, Spangenberg & Hattis Attys.

INVENTORS.
Robert W. Hoedemaker
Charles Molnar
By Wallenstein, Spangenberg & Hattis
Attys.

CONTROL FOR MAGNETIC MEMORY MATRIX

Filed Jan. 9, 1961

5 Sheets-Sheet 4

INVENTORS.
Robert W. Hoedemaker
Charles Molnar
By: Wallenstein, Spangenberg, Hattis & Strampel attys.

Nov. 17, 1964 R. W. HOEDEMAKER ETAL 3,157,864

CONTROL FOR MAGNETIC MEMORY MATRIX

Filed Jan. 9, 1961 5 Sheets-Sheet 5

INVENTORS.
Robert W. Hoedemaker
Charles Molnar
By: Wallenstein, Spangenberg & Hattis Attys.

United States Patent Office 3,157,864
Patented Nov. 17, 1964

3,157,864
CONTROL FOR MAGNETIC MEMORY MATRIX
Robert W. Hoedemaker, Princeton, N.J., and Charles Molnar, Somerville, Mass., assignors to Gulton Industries, Inc., Metuchen, N.J., a corporation of New Jersey
Filed Jan. 9, 1961, Ser. No. 81,419
9 Claims. (Cl. 340—174)

This application is a continuation-in-part application of application Serial No. 819,588, filed June 11, 1959, now abandoned.

The present invention relates in general to the storage of information in magnetic core matrices or similar storage devices. Particular specific aspects of the invention relate to the use of magnetic core matrix as a storage medium for binary coded information representing the values of a number of variables and particularly to control circuitry which converts analog variable value indicating signals into binary coded form in the magnetic core matrix. Certain broad aspects of the invention, however, are not so limited.

Among the general objects of the invention are to provide improved control means for setting (and resetting) the cores of a magnetic core matrix or other magnetic core device. A related object of the invention is to provide an improved means for selectively setting the cores of a magnetic core matrix or similar storage device under control of asynchronously or randomly related signals which, in the preferred application of the invention, include variable responsive signals. Another object of the invention is to provide control means as just described which are simple yet highly reliable.

All aspects of the invention will be disclosed in connection with a variable measuring and storage system wherein the value of each variable is indicated by the timing of a pulse generated by a pulse time modulator means. This means comprises a common reference signal source which generates a progressively varying signal which is compared with the analog signal or characteristic of each variable. When correspondence (or a given state of comparison) exists between the reference signal source and the analog signal or characteristic of a variable, a pulse is generated. Each time modulated pulse could be converted to a binary coded signal by gating the input of a pulse counter with the time modulated pulse. The pulse counter begins its count when the reference signal starts from zero or other minimum signal level. With this arrangement, individual pulse counters and gate circuits are required. This is unsatisfactory from a number of viewpoints, one of which being the large number of counters that are required. It is, accordingly, one of the objects of the present invention to provide a system for converting analog signals to binary coded signals where a large number of variables are involved and which utilizes a minimum of counting components.

In accordance with one specific aspect of the present invention, instead of providing individual counters for storing binary coded information on the values of the variables, a magnetic core matrix is used as a storage medium in a manner where the matrix performs the dual function of gating and storage. The core units of a matrix are usually arranged in adjacent rows and columns, the core units of each column having series connected signal input control windings extending to a common column input line or terminal, the core units of each row having series connected signal input control windings extending to a common row input line or terminal. Each core unit has a core made of a rectangular hysteresis material which is driven from a first or reset state of saturation to a second or set state of saturation when half current set pulses are simultaneously fed to the common input terminals associated with the core. When half current pulses are fed to only one of the control windings of a core, insufficient magnetomotive force is developed to drive the core from one state of saturation to another. A single pulse counter (or coding means as it is sometimes referred to) is utilized for the entire system and equally spaced timing pulses are fed to the counter, which may be a scale-of-two cascaded flip-flop counter. Each stage of such a counter is a flip-flop circuit with a code output line extending therefrom which has one of two possible signal conditions indicating the binary state of the counter stage involved. The signal condition of each counter output controls the presence or absence of a half current set pulse (sometimes referred to as a read-in pulse) at one of the common row input terminals of the matrix.

The time modulated pulse associated with each variable controls the timing for the feeding of a half current set pulse to the common column input terminals of the matrix, so that the output condition of the associated pulse counter stage is transferred or gated into the associated core unit of the column of the matrix at the approximate moment the reference signal and variable signal correspond. In the example of the invention being described, the time modulated pulses and the timing pulses which step the pulse counter are randomly related so that serious count ambiguities could occur if a time modulated pulse occurs at the very instant the counter is being advanced to the next count. In the scale-of-two counter, a number of the digits frequently change in quick succession when a count is advanced by one unit. If the output of the counter is gated into the core matrix at an instant when only part of the digits undergoing a change have been modified, the error in the count stored in the matrix can be substantial (i.e. much more than a one unit error). In accordance with an aspect of the present invention, pulse delay and gating techniques are utilized to ensure the gating of the counter output into the matrix at a time when the pulse counter has been completely set to the current count. The broader phase of this aspect of the invention is not limited to an analog to binary conversion application but extends to the general problem of gating information into a matrix where the control signals which effectuate the generation of the row and column half current set pulses have no definite time relationship.

In accordance with still another aspect of the invention, a pulse forming means is provided for each variable which means responds to the associated time modulated pulse by generating a pulse of indefinite duration. The termination of the latter pulse occurs when the function to be performed thereby has been completed. The outputs of each pulse forming means and pulse counter stage are fed to separate "and" gate or coincidence circuits, sometimes referred to as column and row "and" gates. A given binary output state of a counter stage opens the associated row gate whereas the opposite binary state closes the associated row gate. Similarly, the presence of an output pulse at a pulse forming means will open the associated column gate and the absence of such a pulse will close the associated column gate. Each of the "and" gates has a signal input extending to a source of read-in pulses, sometimes referred to as time gate pulses, which occur in synchronized but delayed relation with respect to the timing pulses which drive the common pulse counter. These pulses are most preferably derived by feeding the timing pulses to a frequency doubler and delay means which provide pulses at twice (or a multiple) of the basic time pulse repetition rate and spaced from the timing pulses. These pulses, either directly or through associated pulse expander means, feed the signal input terminals of the various aforesaid column and row "and" gates. When the time gate pulses occur when the associated "and" gates are open, half current set pulses are generated which are passed through the control windings of the associated matrix core units. The trailing edge of the time gate pulse passing through an open column "and" gate is operable to terminate the output of the associated pulse forming means to avoid or minimize the possibility of the generation of additional unwanted half current set pulse which could gate erroneous information into the matrix.

In accordance with another aspect of the present invention, instead of feeding the output of each column "and" gate directly to the matrix, this output (or the output of another set pulse supplying means) is fed to a read-in control winding of a drive core unit having a core with a rectangular hysteresis characteristic. The latter pulse drives the core from a reset state of saturation to a set state of saturation to induce into a first output winding thereof a half current matrix set pulse. It takes a finite time to drive a drive unit core between extreme states of saturation, so that the pulse fed to the read-in control winding must be of sufficient duration to enable the complete driving of the core between extreme states of saturation. Otherwise, the pulse induced into the first output winding of the drive core unit will be insufficient properly to set the matrix core units, with the result that erroneous or ambiguous data will be stored in the matrix. In the case of the randomly generated time modulated pulse referred to above, it is quite possible that there will be only partial coincidence between the pulse inputs to the column "and" gates (i.e. the time modulated pulse will be initiated during a time gate pulse so that the output of a given "and" gate is a pulse of insufficient duration to effect the complete driving of the drive unit core to its set state of saturation).

In accordance with another aspect of the invention, a feedback winding is provided on the drive unit core which is coupled to the preceding circuits in a manner which will extend the duration of the set pulse fed to the read-in control winding thereof until the core has been completely driven between its extreme states of saturation.

The above and other objects, advantages and features of the invention will become apparent upon making reference to the specification to follow, the claims and the drawings wherein:

FIGS. 1 and 1A together form a detailed box diagram of a preferred form of variable measuring and storage system constructed in accordance with the present invention;

Figure 1:
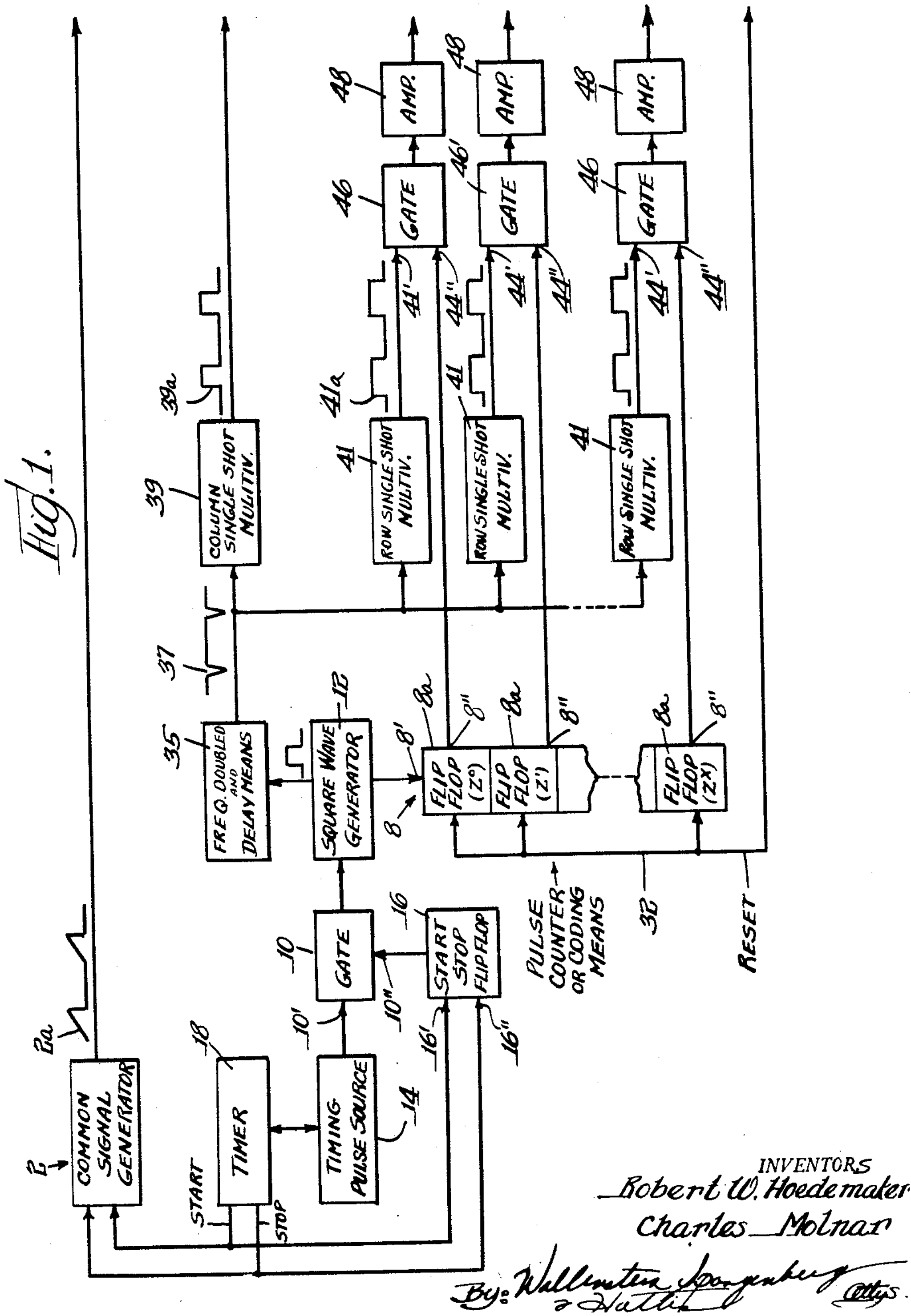
Figure 1A:
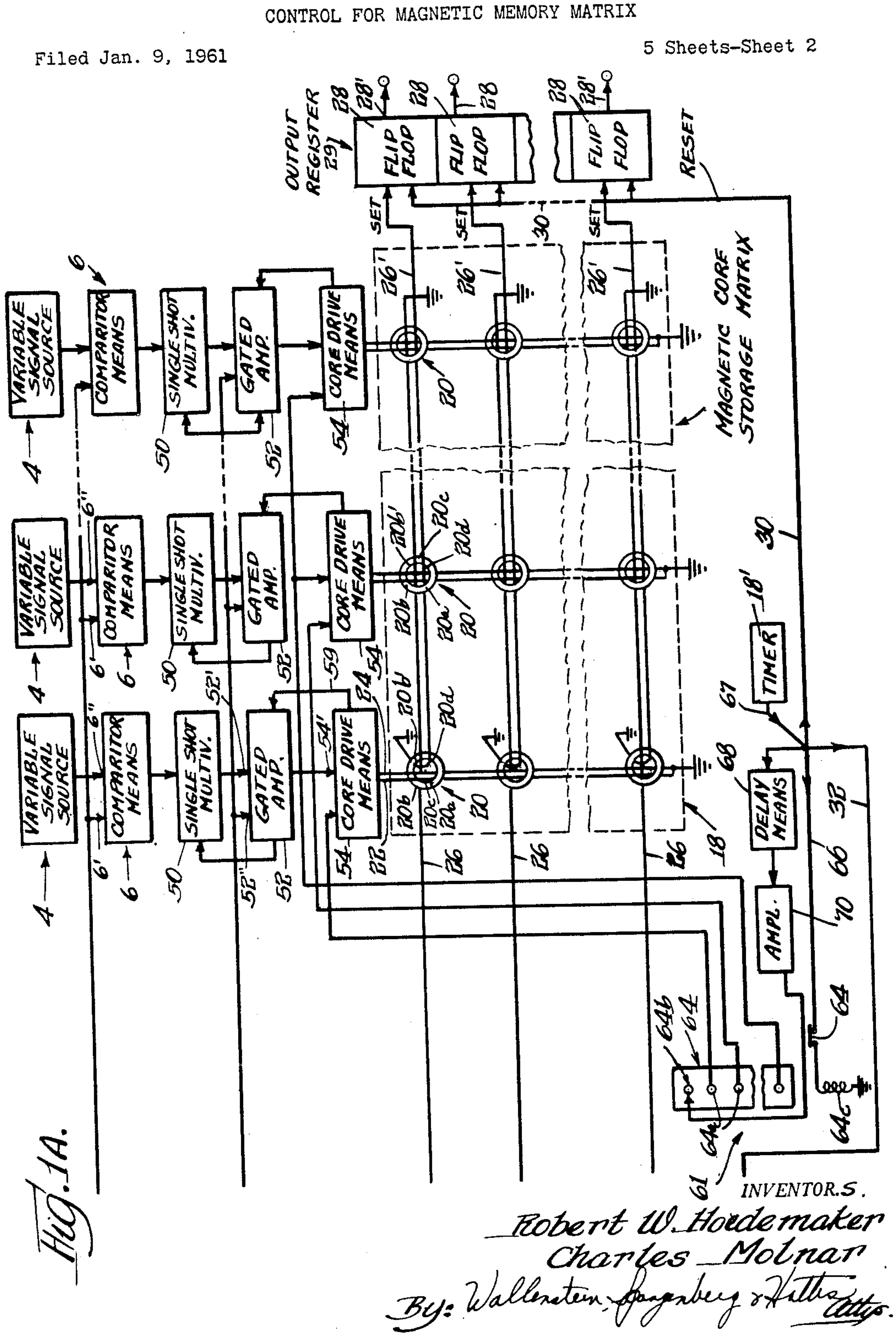

Reference should now be made to the box diagram of FIGS. 1 and 1A which show a preferred form of the present invention. As previously indicated, although certain aspects of the invention are not so limited, the exemplary form of the invention is disclosed in connection with a variable measuring and storage system wherein the values of the variables are indicated by the timing of respective pulses generated by associated pulse time modulator means. In FIGS. 1 and 1A the pulse time modulator means includes a common signal generator 2 which provides a saw-tooth signal output waveform *2a*. The waveform *2a* may be an electrical signal, particularly where the variables involved are indicated by electrical analog signals or, for example, a pressure signal where the variables are pressure variables. The signal sources indicating the values of the variables are generally indicated by reference numeral 4. These sources could be thermocouples in the case of temperature variables, bellows-operated potentiometers in the case of pressure variables, or even the primary variables in the case where the signal generator 2 generates a signal corresponding to the variable as above indicated. The time modulator means further includes comparator means 6 associated with each variable which means has inputs 6′ and 6″. Each signal input 6′ is coupled to the output of the common signal generator 2 and each signal input 6″ is connected to the associated variable signal source 4. Each comparator means 6 produces an output signal, preferably a pulse, at the moment the values of the input signals fed to the signal inputs 6′ and 6″ are equal or reach a given state of comparison.

The comparator means 6 may take any one of a number of well known forms, as, for example, the core type comparator circuit disclosed in U.S. Patent No. 2,739,285, granted March 20, 1956. Alternatively, it could include a capacitor transducer device as disclosed, for example, in application Serial No. 825,384 of Arthur R. Schilling and George N. Nieber on Pressure Transducer, now abandoned, wherein a movable metal diaphragm constituting a common plate of two capacitors is caused to move in accordance with the differences in pressure applied to the opposite sides thereof. In such case, the two variable capacitors are placed in corresponding arms of a Wheatstone bridge circuit which effectively produces a null at the instant the pressures are balanced.

The timing of the outputs of the various comparator means 6 with respect to the initiation or beginning of the saw-toothed signal waveform *2a* at the output of the common signal generator 2 are an indication of the values of the associated variables. Means are provided for indicating time with respect to the beginning of the waveform *2a*, which means most advantageously comprises a common pulse counter 8 (sometimes referred to as a coding means). The pulse counter has an input 8′ which may be directly connected to the output of a gate circuit 10 or indirectly thereto through an intermediate pulse shaping means such as a square wave generator 12 synchronized by the output of the gate circuit 10. The gate circuit 10 has two inputs 10′ and 10″. The input 10′ extends to a timing pulse source 14 which provides timing pulses at a given predetermined frequency. The timing pulses are coupled through the gate circuit 10 when the other input 10″ receives a gate-opening signal from a control circuit shown as a flip-flop circuit 16. The flip-flop circuit 16 has an input 16′ which is triggered into one of its conditions of operation by a set pulse fed from a suitable timer unit 18 at the instant the output signal waveform *2a* of the common signal generator 2 begins a new cycle. The flip-flop circuit 16 has a second input 16″ coupled to the timer 18 which feeds a reset pulse thereto when the saw-tooth waveform *2a* reaches its greatest magnitude. The start and reset pulses generated by the timer unit 18 may also be used to synchronize the operation of the common signal generator 2. It is apparent that the techniques for synchronizing the operation of the common signal generator 2 and the flip-flop circuit 16 are similar to those found in radar or in television timing circuits and the like so that a description of a detailed circuit is believed to be unnecessary.

The setting of the flip-flop circuit 16 opens the gate circuit 10 to allow passage therethrough of the aforementioned timing pulses and the resetting of the flip-flop circuit closes the gate 10. It is apparent that the pulse count accumulated in the pulse counter 8 at any instant is a measure of the value of the output of the saw-tooth waveform *2a*. The pulse counter 8 most advantageously comprises a scale-of-two counter comprising cascaded flip-flop circuits 8a each of which has an output 8″ at which first and second signal ("0" and "1") output conditions exist when the associated flip-flop circuit is respectively set and reset. The outputs 8″ of the various stages of the pulse counter collectively are sometimes referred to as binary bit outputs of the pulse counter. The "1" signal condition of the first flip-flop circuit of the counter represents $2^0(1)$, for the second flip-flop circuit $2^1(2)$, for the third flip-flop circuit $2^2(4)$ and for the *n*th stage $2^{(n-1)}$. The number represented by the coded outputs considered collectively is the sum of the numbers represented by the "1" signal outputs of the pulse counter.

In a manner to be described, the pulse time modulated output of each comparator means 6 gates the binary bit outputs of the pulse counter 8 into the associated column of core units of a magnetic core matrix storage unit generally indicated by reference numeral 18. The matrix 18 may be a conventional core matrix comprising adjacent rows and columns of magnetic core units 20, there being one column of core units for each variable, and the corresponding core units in the various columns of core units constituting a row of core units. Each column core unit, sometimes referred to as a binary bit storage unit, is associated with one of the outputs of the pulse counter 8. Each core unit may comprise a ring 20a of magnetic material preferably having a rectangular hysteresis curve, a first column control winding 20b, a row control winding 20c, and an output winding 20d. Although a single column control winding 20b could suffice, it is preferred that a second column control winding 20b′ be provided. In a manner conventional with magnetic core matrices, the corresponding or first column control windings 20b of each column of core units are connected in series, one end of the series circuit being connected to a common signal input terminal or line 22, sometimes referred to as a variable signal input terminal or line, since it receives a pulse timed in accordance with the value of the associated variable. The other end of the series circuit may be connected to ground. Similarly, where a second column control winding 20b′ is used, the second column control windings of each column of core units are connected in series, with one end of the series circuit extending to the terminal or line 24 and the other end connected to ground. The row control windings 20c of each row of core units are likewise connected in series, with one end of the circuit connected to a common signal input terminal or line 26, sometimes referred to as a read-in signal input terminal or line, and the other end connected to ground. The output windings 20d of each row of core units are connected in series, with one end connecting to a common row output terminal 26′ and the other end connected to ground. As is conventional, the various corresponding column and row windings are each formed by passing a single wire through the various rings of core material forming the row or column of core units involved.

The various row output lines 26 extend to the inputs of various flip-flop circuits 28 collectively forming an output register 29. The presence of an output pulse at an output line 26′ will set the associated flip-flop circuit to one of its conditions and the pulsing thereof through a common reset line 30 will reset the flip-flop circuit. As will appear, the information stored in the various columns of core units of the matrix are periodically fed to the output register flip-flops in succession, with the register being reset before it receives the information stored in the next column of core units to be fed into the output register.

Figures 4, 5:
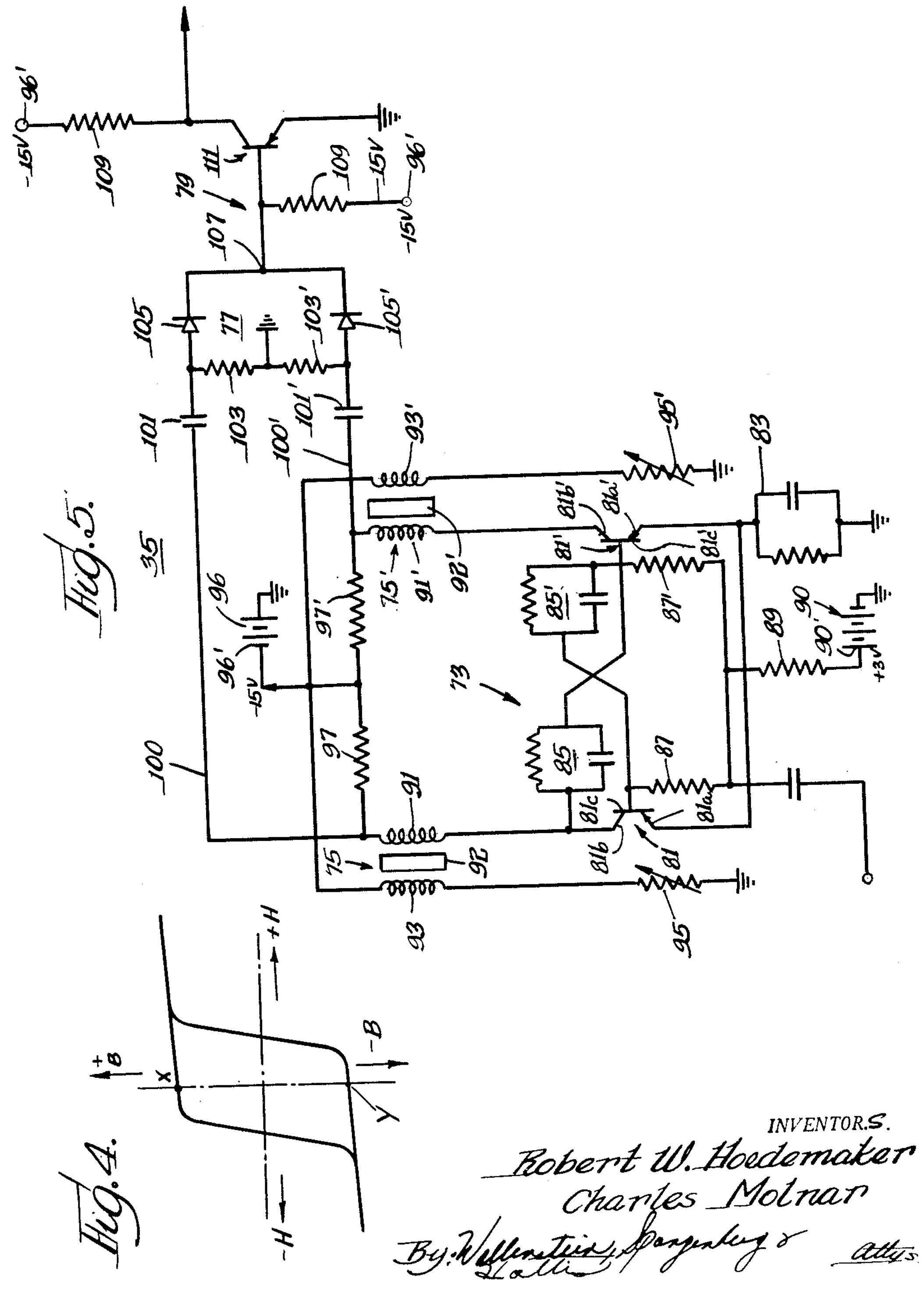
FIG. 4 is a rectangular hysteresis curve for the core of the core drive unit shown in FIG. 3.
FIG. 5 is a circuit diagram of an exemplary frequency doubler and pulse delay means shown in box form in FIG. 4 for generating properly shaped and timed gate pulses, which means are shown in block form in FIG. 1.

In reading information into the magnetic core matrix 18, simultaneous set or read-in pulses of a given polarity, commonly referred to as half current pulses, are fed to one of the column windings 20b and the row control winding 20c of a given storage unit which is to be driven to a set state of saturation. FIG. 4 shows a typical hysteresis characteristic of the rectangular hysteresis core material wherein the upper generally horizontal section X will be considered a set state of saturation and the corresponding generally horizontal lower section Y will be considered a reset state of saturation. If the core is in the reset state of saturation Y, the magnetomotive force of two one-half current set pulses is required to drive the core from the Y to the X state of saturation. Similarly, a magnetomotive force produced by the sum of two one-half current set pulses but applied in the opposite direction is required to reset the core, that is, drive the same from an X to a Y state of saturation.

It is apparent that the timing of the output pulse of a given comparator means 6 is a random timing, that is asynchronously related to the timing pulses. As will appear, half current pulses synchronously related to the timing pulses are fed to the matrix row input lines 26 associated with a counter output having a "1" signal output condition, and so a problem exists in providing a time modulated pulse corresponding to the value of the associated variable which is concurrent with the feeding of read-in pulses to the matrix row input lines 26. The random timing of the output of a comparator means 6 also could create a count ambiguity if it occurred during the small interval of time the pulse counter 8 is responding to a timing pulse.

In accordance with one aspect of the invention, the output of the square wave generator 12 (as shown in the timing diagram, FIG. 2b), which is synchronized with the timing pulses FIG. 2a, is fed to a frequency doubler and delay means 35, which will be described in detail hereinafter. The frequency doubler and delay means provides a series of narrow pulses 37 (FIG. 2c) of a given polarity at twice the frequency of the timing pulses and delayed with respect thereto. These pulses are operable to trigger a number of pulse forming means including a column single shot multivibrator 39 and a single shot multivibrator 41 associated with each matrix row input line 26. The column single shot multivibrator 39 provides two pulses 39a per timing pulse (FIG. 2d) referred to as column time gate pulses, each such time gate pulse, for example, being ten micro-seconds long. Each row single shot multivibrator 41 produces two time gate pulses 41a per timing pulse (FIG. 2g), each such time gate pulse, for example, being twenty micro-seconds long. It should be noted that these pulses are delayed appreciably with respect to the occurrence of the timing pulses FIG. 2a so that the pulse counter 8 is completely set to the new count before the time gate pulses are generated.

The row time gate pulses are fed to the respective inputs 44′ of row gate circuits 46. These gate circuits (as well as gate circuits associated with the column signal input circuits to be described) are also sometimes referred to as coincidence means since the opening of the gate or the generation of a given control output thereat requires the presence of simultaneous signals of a given polarity or type at the two inputs thereof. The row gate circuits 46 have second inputs 44″ coupled respectively to the binary code bit outputs 8″ of the pulse counter 8. The "1" output state of an output of the pulse counter 8 effectively opens the associated gate circuit 46 or prepares the same for producing an output when a time gate pulse is concurrently fed to the gate circuit involved. Accordingly, twenty micro-second gate pulses will appear at the output of any gate circuit 46 associated with a counter output having a "1" output state. The output of the gate circuits 46 are respectively fed to suitable amplifiers 48 whose outputs, in turn, will be half current set pulses fed to the associated matrix row input lines 26.

Referring now to the input circuit associated with each column of the matrix 18, the output of each comparator means 6 is fed to a signal input circuit including a pulse forming means 50 most advantageously in the form of a single shot multivibrator. This multivibrator is triggered into operation by the time modulated pulse at the output of the associated comparator means to provide a pulse such as that indicated in FIGS. 2e or 2h. As will appear, the pulse output of the multivibrator 50 preferably has an indefinite duration, the termination of each output pulse being dependent upon the completion of a gating operation to be described. It should be noted that the initiation of the output of the multivibrator 50 shown in FIG. 2e occurs prior to the initiation of the column and row time gate pulses, whereas the initiation of the output of the multivibrator 50 shown in FIG. 2h occurs during the generation of a column time gate pulse. As will appear, the latter situation creates problems which are overcome by features of the invention to be described.

The output of the multivibrator 50, which is sometimes referred to as a variable responsive multivibrator to distinguish it from the aforementioned row and column signal shot multivibrators 39 and 41, is fed to one of the inputs 52′ of a gate circuit 52 which is shown as a combination gate and amplifier stage. The presence of a multivibrator output pulse effectively opens the gate circuit 52 to enable passage therethrough of the input signal applied to a second input 52″ of the gate circuit 52. The second input 52″ is connected to the output of the column single shot multivibrator 39 which comprises the aforementioned ten microsecond time gate pulses 39a. Thus, when the gate circuit 52 is open, the associated time gate pulses pass through the gate circuit. At the instant of occurrence of the trailing edge of a time gate pulse fed through the gate circuit 52, a control signal is fed back to the variable responsive single shot multivibrator 50 to terminate the generation of the output pulse thereof. It should be noted that the gate circuit 52 receives two time gate pulses per cycle both of which would pass through the gate circuit 52 if the output of the variable responsive single shot multivibrator 50 were not terminated prior to the second pulse. If the time modulated pulse output of the comparator means 6 occurred between the generation of the time gate pulses 39a within a given cycle of operation of the system, unless the output of the multivibrator 50 were terminated immediately after completion of the second time gate pulse, the gate 50 could remain open for a subsequent timing cycle thereby feeding incorrect information into the associated column of core units. The feedback control referred to, therefore, provides a high degree of reliability in the operation of the input circuits to the storage matrix 18.

Figures 2, 3:
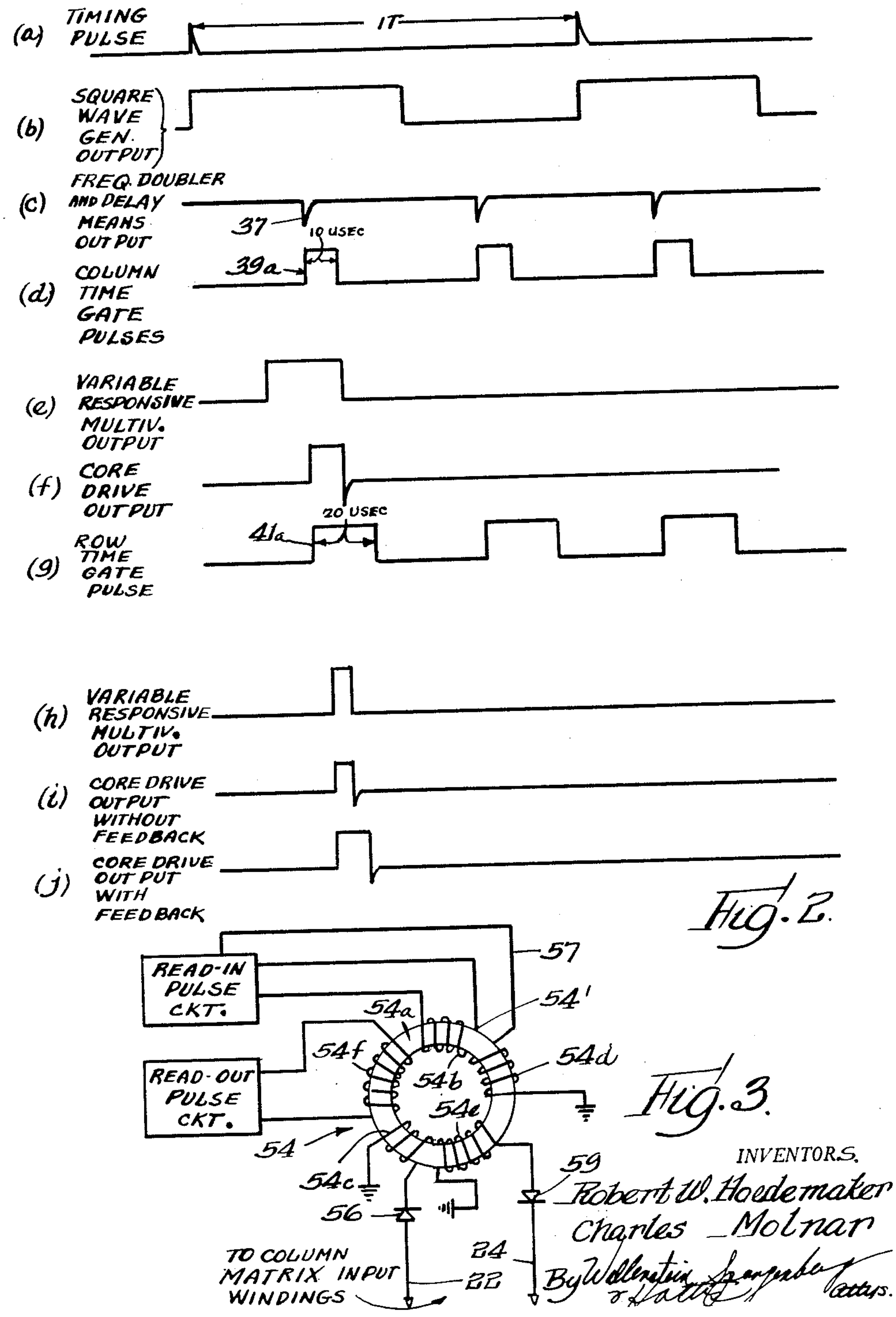
FIG. 2 is a timing diagram of various pulses which are present in the system of FIGS. 1 and 1A.
FIG. 3 is a circuit diagram of a core drive unit shown in box form in FIG. 1 and constituting an aspect of the present invention.

In accordance with a broad aspect of the invention, each gate circuit 52 may act as an amplifier or the output thereof may be fed to a separate conventional amplifier to provide a half current set pulse which is fed to the signal input line 22 of the associated column of core units of the matrix 18. However, in accordance with an aspect of the present invention, a unique core drive means 54 is provided in each signal input circuit which has a general application in the control of the setting and resetting of a storage matrix 18, although it has particular utility in the variable measuring and storage system now being described. Reference should now be made to FIG. 3 which shows the core drive means in detail.

The core drive means is a transformer having a core 54a made of magnetic material having a rectangular hysteresis characteristic like that shown in FIG. 4. The core drive means 54 has two extreme states of saturation to be referred to as a set state of saturation indicated by the portion X of the hysteresis curve and a reset state of saturation shown by the portion Y of the hysteresis curve. The core has a read-in control winding 54b, one end of which represents an input 54′ to the core drive means shown in FIG. 1 leading to the output of the gate circuit 52. The other end of the winding 54b is shown as a common or ground line. To illustrate a generalized application of the core drive means 54, the input circuit to the winding 54b is shown in box form as a read-in pulse circuit of a generalized type. The output of the gate circuit 52 or the generalized read-in pulse circuit shown in FIG. 3 produces a set pulse of sufficient amplitude and duration normally to drive the core 54a from a reset to a set state of saturation. The transformer has a first output winding 54c having a sufficient number of turns that a half current set pulse for the matrix 18 will be induced therein when the core is driven to its set state of saturation. A rectifier 56 is shown connected between one end of the output winding 54c and the associated common matrix column input line 22. The other end of the winding 54c may be connected to ground. The rectifier 56 is connected to pass the half current set pulses referred to above and to block current flow when the core 54a is reset. Since it takes a finite length of time to drive the core between its extreme states of saturation, it is apparent that the half current set pulse must have a sufficient duration to accomplish this result.

As previously indicated, the pulse fed to the input 54′ of the core drive means 54 is normally a pulse having the duration of a column time gate pulse 39a, which is a ten micro-second pulse in the exemplary form of the invention being described. If the duration of the set pulse fed to the transformer is appreciably less than ten micro-seconds, the pulse may be of insufficient duration to drive the core 54a fully to its set state of saturation. As previously indicated, where the time modulated pulse output of the comparator means 6 is initiated during the generation of a time gate pulse 39a, only a fraction of the time gate pulse will pass through the gate circuit 52, as indicated in FIG. 2a which may be of insufficient duration to drive the core 54a fully to its set state saturation. The pulse output induced in the output winding 54a in such case would be a narrow pulse of an amplitude and duration which may be insufficient completely to set the associated cores of the storage matrix 18. This would create ambiguities or errors in the information stored in the matrix. The presence of relatively small unwanted pulses in the circuit leading to the read-in control winding 54b could drive a partially set or reset core 54a fully to saturation and thereby produce a pulse output in the output winding 54c at a time when such such pulse should not be generated. When the core 54a is fully driven to a set state of saturation, any unwanted set pulses fed to the winding 54a will have no effect because the core 54a being fully set will not couple any change in magnetic flux to the output winding 54c. The drive means 54, in such case, is only responsive to a first set pulse which enhances the reliability of the system.

To ensure that the initial set pulse fed to the read-in control winding 54b has a sufficient duration under all conditions, a feedback winding 54d is provided on the core 54a. One end of the feedback winding is connected by a conductor 57 to a part of the read-in pulse circuit which, in the embodiment of the invention shown in FIG. 1, is most advantageously the gate circuit 52. The other end of the winding 54d may be connected to ground. While the core 54a is being driven between its extreme saturation states, the flux conditions in the core are changing so that a voltage is induced in the feedback winding on the core. The voltage which is induced in the feedback winding 54d is utilized to sustain the duration of the set pulse fed to the read-in control winding 54b in any suitable way, one of which will be described later on in the specification in connection with the circuit shown in FIG. 6.

As soon as core 54a is fully driven to a set state of saturation, the induced voltage in the feedback winding 54d comes to an end which in turn results in the termination of the set pulse fed to the read-in control winding 54b. The resultant pulse generated in the first output winding 54c due to the action of the feedback winding 54d is shown in FIG. 2j. It is apparent from FIG. 2 that the half current pulse output of the drive means 54 under the circumstances now being described will be in the neighborhood of ten micro-seconds and that the beginning of this pulse occurs at some point during the generation of the column time gate pulse shown in FIG. 2d as above explained. Since the setting of the cores of the matrix 18 requires coincidence for at least ten micro-seconds between the half current pulses fed to the column and row control windings thereof, the time gate pulses fed to the matrix row input lines 26 must be greater than ten micro-seconds, in fact approximately twenty micro-seconds, to take care of a situation where the time modulated pulse involved begins at a point near the end of a time gate pulse. This is the reason why the row time gate pulses have a twenty micro-second duration.

In order to read out information stored in a column of core units of the storage matrix 18, it is necessary to reset any cores thereof which were previously set. This results in the generation of a pulse in the output winding 20d of any such cores, which are fed to the associated flip-flop circuits 28 of the output register so as to set the same. The cores of the matrix can be reset by feeding half current reset pulses of opposite polarity to the aforementioned half current set pulses simultaneously through the row and column control windings of the matrix core involved. However, in accordance with the present invention, reset of any core of the matrix is obtained by feeding a full current pulse to the column control winding, or ing 20b, if this is the only column control winding, or through the aforementioned column control winding 20b'. A second output winding 54e is provided on each transformer core 54a so that a full current pulse is generated in the winding 54e when the core 54a is driven from the set state of saturation to its reset state of saturation. A rectifier 59 is connected between one end of the winding 54e and the associated matrix column input line 24. The other end of the winding 54e may be grounded. The rectifier 59 is connected to pass the full current pulses generated by the resetting of the core 54a and to block any pulses when the core is set. The core 54a is reset by means of a read-out control winding 54f wound on the core which winding is connected to a read-out pulse circuit. The read-out pulse circuit generates at the appropriate time a reset pulse of proper polarity and duration to drive the core 54a from its set to its reset state of saturation. In this manner, a full curernt pulse is generated in the output winding 54e.

In the case where only a single matrix column control winding 20b is provided for the matrix core units, the output of the second output winding 54e of the drive means 54 is connected to the matrix column input winding 22 through the rectifier 59.

The read-out pulse circuit in FIG. 1 may include a stepping switch 64 of any suitable type having a number of stationary contacts 64a and a wiper 64b which makes progressive contact with the contacts 64a each time a stepping switch solenoid 64c is pulsed. As is conventional in stepping switches, the solenoid 64c controls a normally closed switch 64d which opens each time the solenoid 64c is energized to advance the wiper 64b one contact position. The switch 64d is accordingly connected between one end of the solenoid 64c and a line 66 leading to a common pulse line 67. The pulse line 67 at the appropriate time receives read-out pulses from a timer 18', which pulses are also fed to reset lines 30 and 32 leading respectively to the reset terminals of the output register flip-flops 28 and the pulse counter flip-flops 8a. A read-out operation is carried out after the termination of a measuring cycle, that is after the generation of a saw-tooth waveform 2a by the signal generator 2. During this period, the timer 18' sends a plurality of readout pulses to the solenoid 64c so that all of the stationary contacts of the stepping switching 64 are scanned. The stationary contacts of the stepping switch extend respectively to the readout control windings 54f of the core drive means 54 associated with the various columns of the matrix 18. The stepping switch wiper 64b is connected to an input circuit including a pulse delay means 68 whose input is connected to the pulse line 67, and an amplifier 70 which provides an amplified pulse output of sufficient amplitude and duration to constitute a reset pulse which, when fed to one of the read-out control windings 54f of the core drive means 54, will reset the associated core 54a. The purpose of the delay means 68 is to delay the pulses which effect read-out of the information in the matrix until the stepping switch wiper 64b reaches the next contact 64a. In this manner, the information stored in the various columns of the matrix are sequentially fed to the output register flip-flops 28 which are reset as above explained before receiving signals from the succeeding columns of the matrix. The flip-flops 28 have outputs 28' which are fed to suitable storage or recording means (not shown).

Although the components shown in box form in FIG. 1 are known types of components, it would be helpful to disclose exemplary circuits for a few of them. These include the frequency doubler and delay means 35, and the signal input circuit to each column of the matrix including the gate circuit 52, the associated variable responsive single shot multivibrator 50, and the feedback circuits between the core drive means 54, the gate circuit 52 and the multivibrator 50.

Reference should now be made to FIG. 5 which shows an exemplary circuit for the frequency doubler and delay means 35. The circuit there shown is essentially a flip-flop circuit 73 having a magnetic core delay means 75—75 in the output circuits thereof and a summing circuit 77 connected to a common output circuit 79. The flip-flop circuit includes a pair of PNP type junction transistors 81–81' having emitter electrodes 81a–81a' connected to a common capacitor-resistor biasing network 83, in turn, connected to ground. The collector electrodes 81b or 81b' of each transistor is connected through an associated parallel capacitor-resistor feedback network 85 or 85' to the base electrode 81c or 81c' of the other transistor. The base electrodes 81c and 81c' are connected through respective resistors 87–87' and a common resistor 89 to the positive terminal 90' of a source 90 of positive direct current biasing potential. The collector electrode 81b of the transistor 81 is connected through a winding 91 forming part of the delay means 75. The winding 91 is wound upon a toroidal core 92 made of a rectangular hysteresis material. The core has a biasing winding 93 wound around the same core. One end of the biasing winding is connected through a variable resistor 95 to ground. The other end of the biasing winding 93 is connected to the negative terminal 96' of a source of negative energizing potential 96. The winding 91 is connected through a resistor 97 to the negative terminal 96'. The variable resistor 95 provides a variable control over the degree of initial saturation or unsaturation of the core 93 and in so doing provides a control over the time it takes to drive the core to an opposite state of saturation when transistor 81 becomes conductive.

The collector electrodes 81b' of the transistor 81' is connected through a winding 91' of the delay means 75' which is identical to the core delay means 75. The winding 91' is accordingly wound upon a toroidal core 92' made of a rectangular hysteresis material. The core has a biasing winding 93' having one end connected through a variable biasing resistor 95' to ground and another end connected through resistor 97' to the negative terminal 96'. A conductor 100 extends between the juncture of resistor 97 and the winding 91 to a series circuit of a capacitor 101 and a resistor 103 connected to ground forming a differentiating network. Similarly, a conductor 100' extends between the juncture of resistor 97' and the winding 91' to a series circuit of a capacitor 101' and a resistor 103' connected to ground and forming a differentiating network. A rectifier 105 connected to pass a negative pulse developed across the resistor 103 is connected between the juncture of resistor 103 and the capacitor 101, and a common output point 107 of the summing circuit 77. Similarly, a rectifier 105' connected to pass negative pulses developed across the resistor 103' is connected between the juncture of resistor 103' and the capacitor 101', and the common point 107. A resistor 109 is connected between the common point 107 and the negative terminal 96' of the energizing voltage source 96. The common point 107 is also connected to the base electrode 111 of a PNP juncture type transistor whose emitter electrode is connected to ground and whose collector electrode is connected through a resistor 109 to the negative terminal 96'.

The two transistor flip-flop circuit 73 is essentially a free running multivibrator which produces a high current condition in the transistors 81 and 81' alternately. By varying the current flow in the biasing windings 93 and 93', the precise timing of the leading and trailing edges of the square wave output of the flip-flop circuit can be varied. The differentiating networks and the connections of the rectifiers 105 and 105' of the summing circuit 77 to the common point 107 produce at point 107 a series of negative pulses occurring at twice the pulse repetition rate at which the square wave flip-flop generator 73 operates. As previously indicated, these negative pulses are fed to the column single shot multivibrator 39, 41, etc. which generate the row and column time gate pulses.

Figure 6:
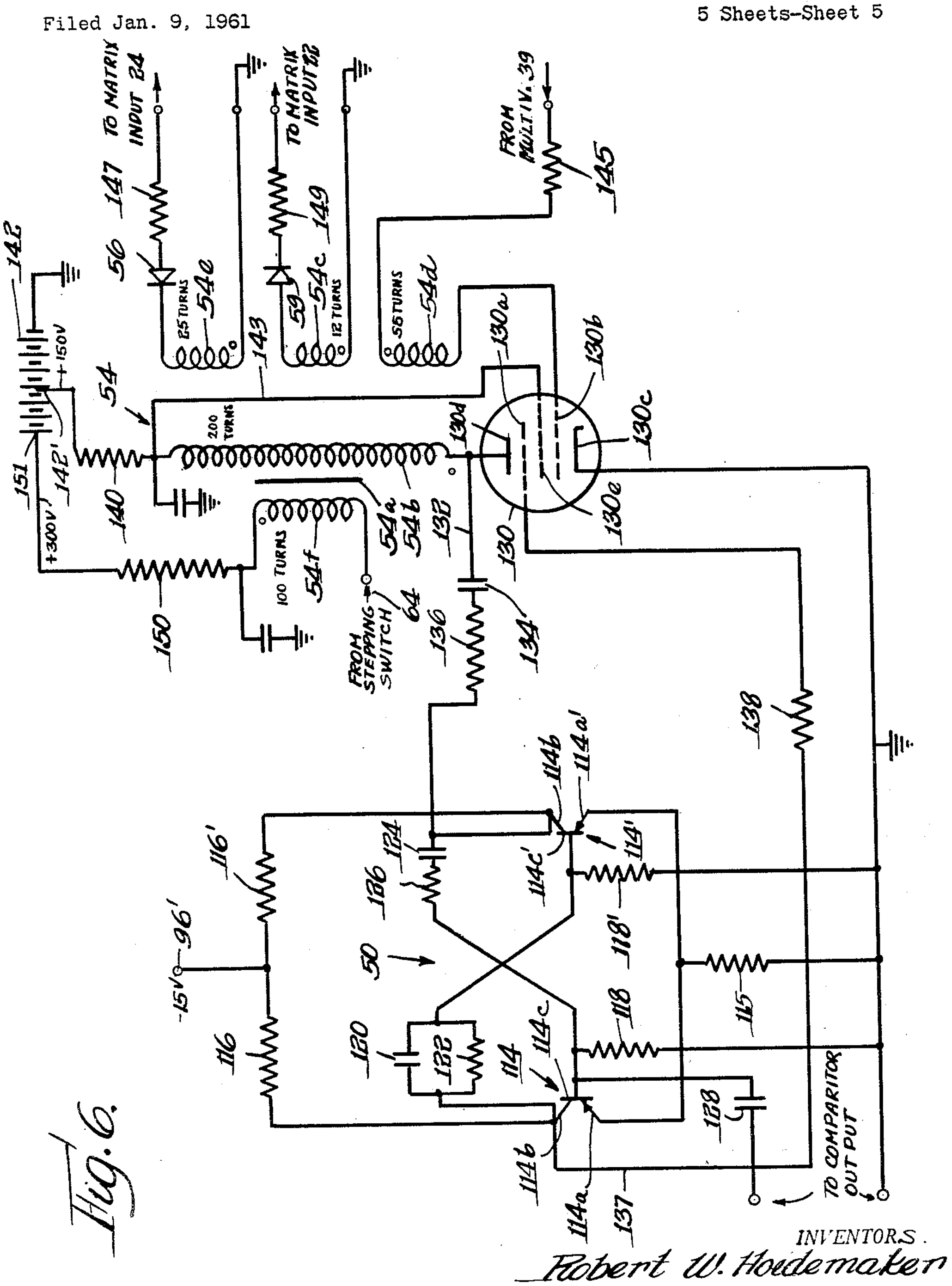
FIG. 6 is a circuit diagram of an exemplary pulse forming means, gated amplifier and core drive means shown in box form in FIG. 1.

Refer now to FIG. 6 which shows a circuit diagram for the signal input circuit associated with one of the columns of the storage matrix 18. This signal input circuit includes the aforementioned single shot (variable responsive) multivibrator 50 comprising a pair of PNP junction transistors 114–114'. The emitter electrodes 114*a* and 114*a*' of these transistors are connected to a common resistor 115 connected to ground. The collector electrodes 114*b* and 114*b*' of these transistors are connected through respective load resistors 116 and 116' to the negative terminal 96' of the (—15 volt) energizing voltage source 96. The base electrodes 114*c* and 114*c*' of the transistors are connected through resistors 118 and 118' to ground. The collector electrode 114*c* of transistor 114 is connected to the base electrode 114*c*' of transistor 114' through a parallel circuit comprising a capacitor 120 and a resistor 122. The collector electrode 114*b*' of transistor 114' is connected to the base electrode 114*c* of transistor 114 through a series circuit of a capacitor 124 and a resistor 126. With the circuit arrangement described, the transistor 114' will be in a normally conductive state and the transistor 114 will be in a normally non-conductive state. The one shot multivibrator circuit 50 is triggered into operation in any suitable way, as for example, by the feeding of a negative pulse from the output of the comparator means 6 through a capacitor 128 to the base electrode 114*c* of the transistor 114. This triggers the transistor 114 into a conductive state which, in turn, renders the transistor 114' non-conductive for a maximum period determined by the time constant of a circuit including the capacitor 120. This period, for example, may be several hundred micro-seconds. However, this time constant is so long that the return of the multivibrator to its normal quiescent state of operation may be normally determined by the timing of a pulse fed through the capacitor 124 and resistor 126 to the base electrode of 114*c* from the output of the gate circuit 52.

The gate circuit 52, as illustrated, includes a pentode 130. A conductor 132 extends from the plate circuit of the pentode 130 through a capacitor 134 and resistor 136 to the coupling capacitor 124. When the pentode tube 130 is rendered highly conductive (i.e. when the gate is opened) at the beginning of a time gate pulse, a resultant negative going pulse at the plate circuit is coupled to the capacitor 124. This negative pulse fed to the base electrode 114*c* of the transistor 114 will maintain conduction of the transistor 114 so that nothing happens to the multivibrator at this time. However, when the pentode 130 becomes non-conductive (i.e. the gate circuit is closed) at the trailing edge of the time gate pulse, a positive going pulse is coupled through the capacitor 124 to the base electrode 114*c* to thereby render the transistor 114 non-conductive, which terminates the single cycle of operation of the one shot multivibrator 50.

As previously indicated, the output of the one shot multivibrator 50 along with the time gate pulse controls the opening of the gate circuit 52 which is, in essence, an "and" gate or coincidence circuit. To this end, a conductor 137 is connected between the collector electrode 114*b* and a resistor 138 connected to the suppressor grid 130*a* of the pentode 130. During the quiescent state of the one shot multivibrator 50, the potential at the collector electrode 114*b* is a negative potential which is coupled to the suppressor grid 130*a* to thereby render the plate circuit of the pentode non-conductive. When the transistor 114 is rendered conductive, the potential of the collector electrode 114*b* and the suppressor grid 130*a* is near ground potential which enables the plate circuit of the pentode 130 to conduct provided the voltage conditions at the other control grid 130*b* of the pentode will permit it. The cathode 130*c* of the pentode 130 is connected to ground and the plate 130*d* thereof is connected through the aforesaid read-in control winding 54*b* of the transformer or core drive unit 54 previously described in connection with FIG. 3. The read-in control winding 54*b* is connected through a resistor 140 to the positive terminal 142' of a source of (150 volts) direct current voltage 142. The screen grid 130*e* is connected by a line 143 to the juncture of resistor 140 and read-in control winding 54*b*. The control grid 130*b* of the pentode 130 is coupled to the aforesaid ten micro-second time gate pulse output of the column single shot multivibrator 39 shown in FIG. 1. It is assumed that the output of the multivibrator 39 is a pulse which goes from minus 15 volts to 0 and back to minus 15 volts. This pulse is fed to the control grid 130*b* through an unique circuit which includes the feedback 54*d* of the transformer 54 and a resistor 145. During the ten micro-second time gate pulse, the plate circuit of the pentode 130 will be conductive provided the variable responsive multivibrator 50 has a pulse output. As previously indicated, a voltage will be induced into the feedback winding 54*d* during the driving of the core 54*a* of the transformer 54 from a reset to a set state of saturation. The connection of the control grid 130*b* of the pentode 130 to the feedback winding 54*d* is such that this induced voltage will continue to render the pentode 130 conductive even after the termination of the time gate pulse until the core 54*a* has been completely saturated. Then, the pentode 130 will be rendered non-conductive again and, as previously indicated, the resultant positive voltage appearing at the plate 130*d* will be in a direction to terminate the pulse output of the variable responsive multivibrator 50.

The circuitry shown in FIG. 6 for the first and second output windings 54*c* and 54*e* of the transformer is substantially as shown and described in FIG. 3, except for the inclusion of resistors 147 and 149 in these circuits. The read-out control winding 54*f* as shown in FIG. 6 has one end connected through a resistor 150 to the (300 volt) positive terminal 151 of the direct current supply source 142 and the other end connected to the stepping switch 64 in a manner previously indicated. It is apparent that the potential of the pulse fed to the read-out control winding 54*f* from the stepping switch is a ground or negative going pulse.

It should be understood that numerous modifications may be made in the preferred form of the invention described above without deviating from the broader aspects of the invention.

What we claim as new and desire to protect by Letters Patent of the United States:

1. A control circuit for setting and resetting matrix magnetic core storage units, said control circuit comprising: a magnetic core drive unit comprising a saturable magnetic core, a read-in control winding on said core, a read-out control winding on said core, a first output winding on said core in which a half current set pulse is induced when the core is set, a second output winding on said core in which a full current reset pulse is induced when said core is reset, a read-in pulse circuit connected to said read-in control winding for generating a set pulse which drives said core from a reset to a set state of saturation to generate a half current set pulse in said first output winding, rectifier means in series with said first output winding for blocking current flow therein only when the core is reset, a read-out pulse circuit connected to said read-out control winding for generating a reset pulse which resets said core to generate a full current reset pulse in said second output winding, and rectifier means in series with said second output winding for blocking current flow in said second output winding only when said core is set.

2. In combination, a series of binary code bit storage units, each of said storage units having a pair of signal input terminals for respectively driving the storage unit from a first to a second binary state when set signals are simultaneously fed thereto, one of the signal inputs of said series of storage units being connected to a common signal input terminal, means for generating set pulses coupled to the other signal input terminals of the series of storage units, a source of pulses randomly related to said set pulses, pulse forming means responsive to each pulse output of said source of pulses by generating a pulse which persists at least until one set pulse is generated by said set pulse generating means, first coincidence means having a pair of inputs respectively coupled to the output of the associated pulse forming means and said set pulse generating means for providing a set pulse upon coincidence of the input pulses thereto, and means coupling the output set pulses of said coincidence means to the common signal input terminal of said series of storage units.

3. In combination, a series of binary code bit storage units, each of said storage units having a pair of signal input terminals for respectively driving the storage unit from a first to a second binary state when set signals are simultaneously fed thereto, one of the signal inputs of said series of storage units being connected to a common signal input terminal, means for generating set pulses coupled to the other signal input terminals of the series of storage units, a source of pulses randomly related to said set pulses, pulse forming means responsive to each pulse generated by said pulse source for providing an output pulse initiated by the beginning of the latter pulse, first coincidence means having a pair of inputs respectively coupled to the output of the associated pulse forming means and said set pulse generating means providing a set pulse during coincidence of the input pulses thereto, means responsive to the trailing edge of the output set pulse of said coincidence means for terminating the output pulse of said associated pulse forming means, and means coupling the output set pulses of said coincidence means to the common signal input terminal of said series of storage units.

4. A data storage system for storing binary coded information on the values of a number of variables, said system comprising: variable responsive means for each variable providing a pulse output timed to indicate the value of the associated variable, a source of timing pulses, coding means comprising pulse counter means coupled to said source of timing pulses for counting the same and providing at respective binary bit outputs thereof a binary coded signal indicating the count accumulated therein, a storage matrix comprising a series of binary code bit storage units for each variable, one such storage unit in each series being provided for each output of said coding means, each of said storage units having a pair of signal input terminals for respectively driving the storage unit from a first to a second binary state when set signals are simultaneously fed thereto, one of the signal input terminals of each series of storage units being connected to a common variable signal input terminal and the corresponding other signal input terminals of the series of storage units being connected to respective common read-in signal input terminals, means for providing time gate pulses synchronously related to said timing pulses, first coincidence means associated with each of said read-in signal input terminals of the matrix and having a pair of inputs respectively coupled to the associated output of said coding means and to said time gate pulse providing means for providing a matrix set pulse upon coincidence of the input pulse from the latter means and a given binary output state of the associated output of said coding means, second coincidence means associated with each series of storage units and having a pair of inputs respectively coupled to the output of the associated variable responsive means and said time gate pulse providing means for providing a matrix set pulse upon coincidence of the outputs of said variable responsive means and said time gate pulse providing means, and means coupling the output set pulses of said second coincidence means to the variable signal input terminal of the associated series of storage units.

5. A data storage system for storing binary coded information on the values of a number of variables, said system comprising: variable responsive means for each variable providing a pulse output timed to indicate the value of the associated variable, a source of timing pulses, coding means comprising pulse counter means coupled to said source of timing pulses for counting the same and providing at respective binary bit outputs thereof a binary coded signal indicating the count accumulated therein, a storage matrix comprising a series of binary code bit storage units for each variable, one such storage unit in each series being provided for each output of said coding means, each of said storage units having a pair of signal input terminals for respectively driving the storage unit from a first to a second binary state when set signals are simultaneously fed thereto, one of the signal input terminals of each series of storage units being connected to a common variable signal input terminal and the other corresponding signal input terminals of the various series of storage units being connected to respective read-in signal input terminals, pulse multiplying means for providing time gate pulses at a multiple pulse repetition rate of that of said timing pulses, first coincidence means associated with each of said read-in signal input terminals of the matrix and having a pair of inputs respectively coupled to the associated output of said coding means and to said pulse multiplying means for providing a matrix set pulse upon coincidence of the input pulse from said pulse multiplying means and a given binary output state of the associated output of said coding means, second coincidence means associated with each series of storage units and having a pair of inputs respectively coupled to the output of the associated variable responsive means and said common pulse multiplying means for providing a matrix set pulse initiating pulse at an output thereof upon coincidence of the input pulses thereto, and a saturable core drive unit for each series of matrix storage units, said drive unit having a core made of a rectangular hysteresis material, an input winding coupled to the output of the associated second coincidence means which drives the core from a reference to a set state of saturation and an output winding coupled to the associated common variable signal input terminal of the associated series of matrix storage units for feeding a set pulse thereto when the core is set.

6. A data storage system for storing binary coded information on the values of a number of variables, said system comprising: variable responsive means for each variable providing a pulse output timed to indicate the value of the associated variable, a source of timing pulses, coding means comprising pulse counter means coupled to said source of timing pulses for counting the same and providing at respective binary bit outputs thereof a binary coded signal indicating the count accumulated therein, a storage matrix comprising a series of binary code bit storage units for each variable, one such storage unit in each series being provided for each output of said coding means, each of said storage units having a pair of signal input terminals for respectively driving the storage unit from a first to a second binary state when set signals are simultaneously fed thereto, one of the signal input terminals of each series of storage units being connected to a common variable signal input terminal and the other corresponding signal input terminals of the various series of storage units being connected to respective common read-in signal input terminals, pulse delay means for providing time gate pulses at a multiple pulse repetition rate of that of said timing pulses and delayed with respect thereto, first coincidence means associated with each of said read-in signal input terminals of the matrix and having a pair of inputs respectively coupled to the associated output of said coding means and to said pulse delay means for providing a matrix set pulse upon coincidence of the input pulse from said pulse delay means and a given binary output state of the associated output of said coding means, second coincidence means associated with each series of storage units and having a pair of inputs respectively coupled to the output of the associated variable responsive means and said common pulse delay means for providing a matrix set pulse upon coincidence of the input pulses thereto, and means coupling the output set pulses of said second coincidence means to the common variable signal input terminal of the associated series of storage units.

7. In combination with a magnetic core matrix having columns and rows of magnetic core units each having a magnetic core made of a rectangular hysteresis material, first and second control winding means on the core for driving the core between opposite states of saturation when half current set pulses are simultaneously fed through the control winding means, and output winding means in which a signal is generated when the core is driven between opposite states of magnetic saturation, means connecting said first control winding means in each column of core units to a common input, means connecting said second control winding means in each row of core units to a common input, and a read-in pulse circuit for feeding half current pulses to the common matrix inputs associated with either said columns or rows of core units, a control circuit associated with the common inputs of the other of same and comprising: a drive core unit associated with each of the latter core units, each of said drive core units comprising a magnetic core having a substantially rectangular hysteresis characteristic, a read-in control winding which drives the latter core from a first to a second state of saturation when a set pulse is fed thereto, and a first output winding into which is induced a half current matrix set pulse when the latter core is driven between said states of saturation, a pulse circuit coupled to said first control winding for generating said drive unit set pulse, said pulse circuit comprising a time modulated pulse source, coincidence sensing means having a first and a second input, said first input being coupled to the output of said time modulated pulse source, and a time gate pulse source for providing time gate pulses occurring concurrently with said half current pulses of said read-in pulse circuit, the output of said time gate pulse source being connected to the second input of said coincidence sensing means, and said coincidence sensing means having an output coupled to the read-in control winding of the associated drive core unit and providing a drive core set pulse when the time modulated and time gate pulses are concurrent.

8. In combination with a magnetic core matrix having columns and rows of magnetic core units each having a magnetic core made of a rectangular hysteresis core material, first and second control winding means on the core for driving the core between opposite states of saturation when half current set pulses are simultaneously fed through the control winding means, and output winding means in which a signal is generated when the core is driven between opposite states of magnetic saturation, means connecting said first control winding means in each column of core units to a common input, means connecting said second control winding means in each row of core units to a common input, and a read-in pulse circuit for feeding half current pulses to the common matrix inputs associated with either said columns or rows of core units, a control circuit associated with the common inputs of the other of same and comprising: a drive core unit associated with each of the latter core units, each of said drive core units comprising a magnetic core having a substantially rectangular hysteresis characteristic, a read-in control winding which drives the latter core from a first to a second state of saturation when a set pulse of at least a given minimum duration is fed thereto, a first output winding into which is induced a half current matrix set pulse when the latter core is driven between said states of saturation, and a feedback winding, a pulse circuit coupled to said first control winding for generating said drive unit set pulse, said pulse circuit comprising a time modulated pulse source, coincidence sensing means having a first and a second input, said first input being coupled to the output of said time modulated pulse source, a time gate pulse source for providing time gate pulses occurring concurrently with said half current pulses of said first read-in pulse circuit, the output of said time gate pulse source being connected to the second input of said coincidence sensing means, said coincidence sensing means having an output coupled to the read-in control winding of the associated drive core unit and providing a drive core set pulse when the time modulated and time gate pulses are concurrent for at least said minimum duration, and means coupling said drive core unit feedback winding to said coincidence sensing means for sustaining the output thereof while the drive core is being driven from said first to said second state of saturation.

9. In combination with a magnetic core matrix having columns and rows of magnetic core units each having a magnetic core made of a rectangular hysteresis core material, first and second control winding means on the core for driving the core between opposite states of saturation when half current set pulses are simultaneously fed through the control winding means, and output winding means in which a signal is generated when the core is driven between opposite states of magnetic saturation, means connecting said first control winding means in each column of core units to a common input, means connecting said second control winding means in each row of core units to a common input, and a first read-in pulse circuit for feeding half current pulses to the common matrix inputs associated with either said columns or rows of core units, a control circuit associated with the common inputs of the other of same and comprising: a drive core unit associated with each of the latter core units, each of said drive core units comprising a magnetic core having a substantially rectangular hysteresis characteristic, a read-in control winding which drives the latter core from a first to a second state of saturation when a set pulse is fed thereto, a reset control winding which resets the core when a reset pulse is fed thereto, a first output winding into which is induced a half current matrix set pulse when the latter core is driven between said states of saturation, a rectifier connected between said first output winding and the associated matrix input for blocking induced current when the latter core is reset to said first state of saturation, a second output winding into which is induced a full current matrix reset pulse capable of resetting all the associated matrix cores, a rectifier connected between said second output winding and the associated matrix input for blocking induced current when the drive unit core is set, a variable responsive pulse circuit coupled to said first control winding for generating said drive unit set pulse, said variable responsive pulse circuit comprising a time modulated pulse source which provides a pulse timed in accordance with the value of the associated variable, coincidence sensing means having a first and a second input, said first input being coupled to the output of said time modulated pulse source, a time gate pulse source for providing time gate pulses occurring concurrently with said half current pulses of said first read-in pulse circuit, the output of said time gate pulse source being connected to the second input of said coincidence sensing means, said coincidence sensing means having an output coupled to the read-in control winding of the associated drive core unit and providing a drive core set pulse when the time modulated and time gate pulses are concurrent, and a read-out pulse circuit coupled to said drive unit reset control winding for providing at a selected time a reset pulse which resets said drive unit core and the associated matrix core units.

References Cited in the file of this patent

UNITED STATES PATENTS

| | | |
|---|---|---|
| 2,772,370 | Bruce | Nov. 27, 1956 |
| 2,901,735 | Lawrence | Aug. 25, 1959 |
| 2,922,145 | Bobeck | Jan. 19, 1960 |
| 2,939,114 | Bobeck et al. | May 31, 1960 |
| 2,956,271 | Keller | Oct. 11, 1960 |